(12) United States Patent
Sloss et al.

(10) Patent No.: US 11,789,146 B2
(45) Date of Patent: Oct. 17, 2023

(54) COMBINED METHOD OF LOCATION OF SONAR DETECTION DEVICE

(71) Applicant: CODA OCTOPUS GROUP INC., Orlando, FL (US)

(72) Inventors: Martyn Sloss, Fife (GB); Keith Cobry, Edinburgh (GB)

(73) Assignee: CODA OCTOPUS GROUP INC., Orlando, FL (US)

(*) Notice: Subject to any disclaimer, the term of this patent is extended or adjusted under 35 U.S.C. 154(b) by 811 days.

(21) Appl. No.: 16/693,684

(22) Filed: Nov. 25, 2019

(65) Prior Publication Data
US 2021/0141086 A1 May 13, 2021

Related U.S. Application Data

(60) Provisional application No. 62/932,734, filed on Nov. 8, 2019, provisional application No. 62/931,956, filed on Nov. 7, 2019.

(51) Int. Cl.
| | |
|---|---|
| *G01S 15/89* | (2006.01) |
| *G01S 7/52* | (2006.01) |
| *G01S 7/53* | (2006.01) |
| *G01S 7/524* | (2006.01) |
| *G01S 15/42* | (2006.01) |
| *G01S 17/86* | (2020.01) |
| *G01S 13/86* | (2006.01) |
| *G10K 11/34* | (2006.01) |

(52) U.S. Cl.
CPC .......... *G01S 15/89* (2013.01); *G01S 7/52003* (2013.01); *G01S 7/524* (2013.01); *G01S 7/52047* (2013.01); *G01S 7/53* (2013.01); *G01S 13/862* (2013.01); *G01S 15/42* (2013.01); *G01S 15/8902* (2013.01); *G01S 15/8925* (2013.01); *G01S 15/8977* (2013.01); *G01S 17/86* (2020.01); *G10K 11/34* (2013.01)

(58) Field of Classification Search
CPC .. G01S 15/89; G01S 7/52003; G01S 7/52047; G01S 7/524; G01S 7/53; G01S 13/862; G01S 15/42; G01S 15/8902; G01S 15/8925; G01S 15/8977; G01S 17/86; G01S 7/6245; G01S 15/107; G10K 11/34
See application file for complete search history.

(56) References Cited

U.S. PATENT DOCUMENTS

| | | | |
|---|---|---|---|
| 6,438,071 B1 * | 8/2002 | Hansen | G01S 15/89 367/88 |
| 10,984,543 B1 * | 4/2021 | Srinivasan | G06V 20/56 |
| 2003/0206489 A1 * | 11/2003 | Preston | G01S 7/52003 367/88 |
| 2005/0093859 A1 * | 5/2005 | Sumanaweera | G06T 15/08 345/419 |

(Continued)

*Primary Examiner* — Daniel Pihulic
(74) *Attorney, Agent, or Firm* — Barnes & Thornburg LLP

(57) ABSTRACT

A method of real time three dimensional (3D) sonar imaging is disclosed, where large array of sonar signal detectors images an underwater object and electromagnetic measuring means fixed in a known position with respect to the large array of sonar detectors measure the position of an above water object which has a known position with respect to the underwater object. The position of the sonar detector may be corrected to give a stable image of the underwater object from ping to ping of the sonar imaging system.

17 Claims, 1 Drawing Sheet

(56) References Cited

U.S. PATENT DOCUMENTS

| | | | |
|---|---|---|---|
| 2007/0159922 A1* | 7/2007 | Zimmerman | G01S 15/86 |
| | | | 367/103 |
| 2014/0064032 A1* | 3/2014 | Sloss | G01S 15/89 |
| | | | 367/88 |
| 2015/0015433 A1* | 1/2015 | Noon | G08B 7/06 |
| | | | 342/22 |
| 2017/0082739 A1* | 3/2017 | Horner | G01S 7/52003 |
| 2017/0227470 A1* | 8/2017 | Cesarano | G08G 9/02 |
| 2017/0315235 A1* | 11/2017 | Steenstrup | G01S 7/534 |
| 2018/0011190 A1* | 1/2018 | Morales | G01S 7/536 |
| 2021/0141071 A1* | 5/2021 | Cunningham | G01S 15/8902 |
| 2021/0141072 A1* | 5/2021 | Sloss | G01S 7/52047 |
| 2021/0141086 A1* | 5/2021 | Sloss | G01S 7/52003 |
| 2021/0141087 A1* | 5/2021 | Cunningham | G01S 15/42 |
| 2022/0026570 A1* | 1/2022 | Cunningham | G01S 7/539 |
| 2022/0171056 A1* | 6/2022 | Cunningham | G01S 15/8925 |

* cited by examiner

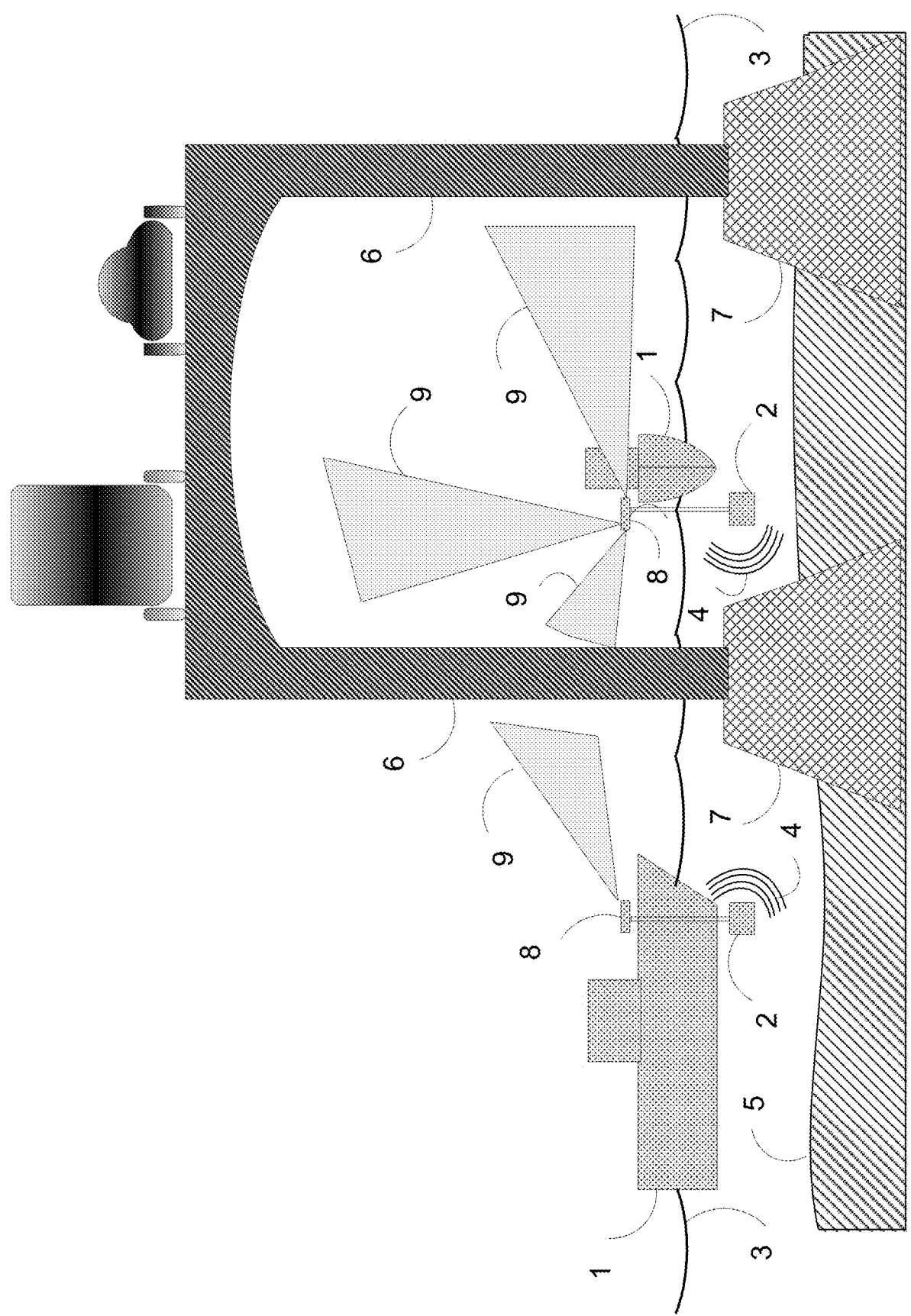

COMBINED METHOD OF LOCATION OF SONAR DETECTION DEVICE

RELATED PATENTS AND APPLICATIONS

The following US Patents and US patent applications are related to the present application: U.S. Pat. No. 6,438,071 issued to Hansen, et al. on August 20; U.S. Pat. No. 7,466,628 issued to Hansen on Dec. 16, 2008; U.S. Pat. No. 7,489,592 issued Feb. 10, 2009 to Hansen; U.S. Pat. No. 8,059,486 issued to Sloss on Nov. 15, 2011; U.S. Pat. No. 7,898,902 issued to Sloss on Mar. 1, 2011; U.S. Pat. No. 8,854,920 issued to Sloss on Oct. 7, 2014; and U.S. Pat. No. 9,019,795 issued to Sloss on Apr. 28, 2015; U.S. patent application Ser. Nos. 14/927,748 and 14/927,730 filed on Oct. 30, 2015, Ser. No. 15/978,386 filed on May 14, 2018, Ser. No. 15/908,395 filed on Feb. 28, 2018, Ser. No. 15/953,423 filed on Apr. 14, 2018 by Sloss, Ser. No. 16/362,255 filed on Mar. 22, 2019 by Abbas, and 62/818,682 filed Mar. 14, 2019 by Abbas, are also related to the present application. The above identified patents and patent applications are assigned to the assignee of the present invention and are incorporated herein by reference in their entirety including incorporated material.

FIELD OF THE INVENTION

The field of the invention is the field of visualization and/or use of data from sonar signals scattered from objects immersed in a fluid.

OBJECTS OF THE INVENTION

It is an object of the invention to improve visualization using sonar imaging. It is an object of the invention to measure and record the positions and orientations of submerged objects. It is the object of the invention increase the accuracy of measuring the relative position of submerged objects with respect to above water objects. It is the object of the invention to provide a time series of sonar images corrected for change of relative position of a sonar receiving device and underwater objects during the time series.

SUMMARY OF THE INVENTION

A series of sonar pings are sent into an insonified volume of water and reflected or scattered from submerged object(s) in the insonified volume of water. One or more large sonar receiver arrays of sonar detectors are arranged below the surface of the water and record the phase and amplitude of reflected sonar ping sound waves. The data recorded is analyzed to produce a series of 3 dimensional sonar images of the submerged object(s) for each ping. One or more measuring devices are arranged above the surface of the volume of water and are connected in a known spatial relationship with the sonar receiver(s). The measuring device(s) map relative locations of objects above the surface of the volume of water to determine the spatial coordinates of the measuring devices with respect to the locations of the above water objects. If the submerged objects reflecting or scattering the sonar pings and the above water are in fixed position with respect to each other, the position of the sonar receivers with respect to the above water objects and the submerged objects can now be calculated during each sonar ping. The 3 dimensional sonar images derived from the sonar data may be corrected to account for the relative movement between pings of the receiver array or arrays with respect to the above and below water objects. Above water and below water objects like bridge piers and underwater buttresses that are both fixed in space and fixed relative to each other can be corrected for movement of the receiver. For under water and above water objects that move, but are fixed in space with respect to each other like a hull and a superstructure of a ship, sonar images can be corrected to remove the relative motion of the ship with respect to the sonar receiver and a vessel carrying the receiver. The images may then be presented as a video presentation at a preferred frame rate of greater than 5 pings per second or merged together to produce a 3D map. The steadiness of the image can then allow the use of prior images to correct succeeding images.

BRIEF DESCRIPTION OF THE DRAWING

FIG. 1 shows equipment useful to carry out the method of the invention.

DETAILED DESCRIPTION OF THE INVENTION

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be difficult for even the best and fastest computers to pick out. Much effort has thus been spent in turning data into images.

In particular, images which are generated from data which are not related to traditional visual light-based optics require skill to bother effectively produce and interpret. One such type of data is sonar data, wherein a sonar signal pulse is sent out from a generator into a volume of fluid, and the reflected sound energy from objects in the insonified volume is recorded by one or more detector elements. The term "insonified volume" is known to one of skill in the art and is defined herein as being a volume of fluid through which sound waves are directed. In the present invention, a sonar signal pulse of sound waves called a ping is sent out from one or more sonar ping generators, each of which insonifies a roughly conical volume of fluid.

The field of underwater sonar imaging is different from the fields of medical ultrasonic imaging and imaging of underground rock formations because there are far fewer sonar reflecting surfaces in the underwater insonified volume. Persons skilled in the medical and geological arts would not normally follow the art of sonar imaging involving such sparse targets.

3D sonar imaging may be used in a variety of infrastructure survey applications to assess the structural integrity of critical civil and military maritime assets, one of the most important of which includes the pilings and abutments of bridges spanning rivers, inlets, and harbors. These require regular inspection for public safety reasons and typically this work is carried out by teams of divers inspecting the piling directly. 3D sonar imaging, however, allows this work to be carried out more quickly and safely and at much lower cost. As a survey vessel traverses a path about the structure of interest, multiple individual sonar pings produce multiple individual 3D images that are stitched together to generate an underwater video or map, which requires knowledge of the sonar ping timing and the vessel position and orientation as it traverses the survey path. Currently, such 3D scene reconstructions are performed in conjunction with real-time GPS (Global Positioning System) data and Inertial Measurement Unit (IMU) orientation data. These data are synchronized with sonar echo receiving and processing hardware and are fed to a primary data processing hardware/software, which displays the 3D scene to the operator.

In bridge piling inspection, however, it is often the case that the survey vessel will pass under the bridge and the GPS reception will drop out for a long enough duration that an accurate 3D scene may not be rendered in real-time. While typical maritime GPS systems, or the survey vessels themselves, may have one or more Inertial Measurement Units (IMUs) to provide additional information on vessel motion, these units are prone to significant drift from integration errors after short periods and require frequent recalibration using the GPS signal. In this statement we describe an alternative solution for maintaining real-time navigational data while conducting 3D sonar surveys in the absence of a GPS signal.

Similarly, 3D sonar mapping may be performed for hull inspection applications, where the requirement is often to inspect the hull of vessels to ensure that parasitic objects are not illegally placed on the vessel. This application suffers from the same problem of GPS data dropping out—thus affecting the accuracy of the data.

FIG. 1 shows a sketch of a vessel 1 floating in water. One or more ultrasonic sonar ping generators 2 are suspended under the water surface 3 and are attached to or are in a known position relative to vessel 1. Ping generators 2 emit a series of sonic pings 4 into a volume of water between the water surface 3 and the seabed 5. The ultra sonic sound waves 4 strike objects 6 and 7 in the volume or on the seabed 5 and are reflected back towards the one or more sonar ping generators. The ultrasonic ping generators 2 are attached to or are in a known position to the to one or more large array multielement sonar receivers (not shown) for receiving sonic waves reflected from the volume of water. In FIG. 1, a pier 6 embedded in a buttress 7 is shown.

The sonar ping generators 2 may be attached rigidly or movably in a known relationship to one or more vessels 1. Objects 6 and 7 may be suspended in the water, lying on the seabed 5, or be buried in the sea bed 5.

The one or more large array multielement sonar receivers mounted in positions fixed or known with respect to the sonar ping generators 2 and the vessel 1 measure the phase, intensity, and arrival time of the reflected sonar pings. The phase, intensity, and arrival time data are processed to provide three dimensional location data measuring sonar reflecting surface locations. The seabed 5 surface and the object 6 and 7 surfaces may be similarly measured to give three dimensional location data of the reflecting surfaces with respect to the large array sonar detectors. A series of outgoing ping pulses may be sent out with an outgoing ping frequency $P_f$. A sonar ping generally has a constant acoustic frequency f. (The frequency f is sometimes varied in the prior art during the ping in a method called a chirped pulse ping, where the pulse frequency either increases or decreases throughout the pulse.) A master oscillator (not shown) produces a square wave voltage output at frequency f, and the ping generator uses the master oscillator to produce outgoing sinusoidal sound waves in phase with the master oscillator.

Reflected acoustic waves are received by each detector element of the large multielement sonar detector array 2. The detector arrays measure the pressure vs time of the reflected ping acoustic waves at each element and return an analog electrical voltage signal representing the sound amplitude versus time of the sound wave impinging on the element. The electrical voltage signals are digitally sampled at precisely known times with respect to the phase of the acoustic ping generated by the sonar transmitter.

The large array multielement detector is constructed with a multitude of sonar detector elements which may be of arbitrary shape and size, and may be arranged in an arbitrary geometrical configuration such that signal processing techniques allow a mathematical reconstruction of the 3D image. The sonar detector array may be arranged on a planar two-dimensional surface, or may further be constructed on a curved surface for specific uses. The sonar detector array will potentially have different angular resolutions along arbitrary axes, according to the details of the particular detector array configuration. Effective sonar video surveillance is preferably shown by using data from at least 5 pings per second. Ping rates of 10 pings per second are more preferable for presenting video data to humans, 20 pings per second are even more preferable.

The method of the invention starts out by processing the phase, intensity, and arrival time data to provide three-dimensional location data points related to the sonar reflecting surface locations. The viewpoint of the sonar images changes from ping to ping, and during a ping, since the sonar ping generator and the sonar receiver array are not fixed in space but move, roll, and yaw with the vessel 1. The image generated for each ping must be corrected to reflect the view point change. In the prior art, the image may be stabilized by measuring the position of the vessel 1 in time using an Inertial Monitoring Unit (IMU), which uses a double integration of acceleration data measured by accelerometers. Inexpensive accelerometers typically drift fast enough over a period of few seconds that an object in the sonar field of view will appear to drift by a noticeable amount compared to the resolution of the sonar system. This drift is typically corrected by measuring the position of the vessel 1 with GPS (global position satellite) technology.

The method of the invention is to combine the sonar images with range measurements measured from the vessel 1 to objects viewable above the water. Range measurements are made from a range measurement device 8 mounted in a known relationship with the sonar detection array and the sonar ping generator 2.

The proposed solution preferably uses video photogrammetry in conjunction with an Inertial Monitoring Unit (IMU) used in conjunction with real time 3D sonar imaging in order to maintain navigational data for stitching together individual 3D images from individual sonar pings into a composite 3D underwater scene in real time in the absence of a GPS signal. Photogrammetry is an optical technique in which the path of a camera or other ranging device through the environment may be calculated based on the frame-to-frame change of position of an identifiable feature in the environment. FIG. 1 shows possible fields of view 9 of a ranging device to objects fixed in space. The identified environmental features in the fields of view 9, typically referred to as "keypoints", are obtained with a corner-detection, or similar, algorithm. These keypoints each have a mathematically derived signature, allowing them to be matched from frame to frame, even as the keypoint position moves within the frame. This process is termed "keypoint matching". "Optical flow" is the process of tracking the motion of keypoints in a video and is a component in the algorithm for calculating the motion of the camera itself.

In order to calculate the correct distances traveled or the correct distances of keypoints from a single camera, a known real-world reference length (e.g. the width of a piling or distance to a buoy) must be available.

Because it is not generally possible to know a priori an external reference dimension in an arbitrary environment, measurement of parallax between two synchronized cameras with fixed spacing is more preferable than images using a single camera to calculate the real-world distances. The spacing between the synchronized cameras serves as the reference distance, and keypoints are matched between these two cameras (left/right). The disparity in position of the matched keypoints in the left and right frames allow depth and distance calculation. Optical video images are significantly less noisy than the 3D sonar images, making keypoint identification and optical flow calculation reliable.

A single pixel is the minimal unit of resolution in a video frame; this, along with the mathematics of parallax, leads to the fact that large spacing between the cameras will provide better resolution of features at greater distance from the camera. However, excessive spacing of the cameras will lead to an inability to resolve features too close to the camera. These resolution relations may be mathematically calculated to determine ideal camera spacing depending on the distance from the camera of environmental features (keypoints). A number of arrangements are possible.

The two cameras may be mounted within a common housing with constant fixed spacing between the two cameras. Associated hardware is preferably integrated in the module, allowing for synchronization of the two (left/right) video cameras. It is essential that the two cameras are synchronized so that only the fixed spacing contributes to the position disparity of the left/right matched keypoints and does not include the motion of the survey vessel due to asynchronisity. This housing contains communications interfaces for transmitting the video data to the primary processing unit.

An alternative method of the invention is to use more than two cameras for photogrammetry, positioned in a known relation to the sonar detector array. The cameras are mounted with known spacing from each other within a housing or on a rail. This method expands upon the functionality of the two-camera system noted above but allows for the processing of video data from two or more camera pairs. This permits the operator to switch between camera pairs with different spacing, allowing the optical flow algorithm to process feature keypoints in different distance ranges from the camera for calculating the camera path. An alternate approach is to allow for the simultaneous processing the two or more camera pairs, fusing the optical flow calculations over a larger composite distance range simultaneously to calculate the camera path.

While one or more cameras may be fixedly mounted on a rail or in a housing which is fixedly connected to the array detector and ping generator units, the associated units may be moved in known relationship to each other to change field of view, range, etc.

Other means of non-sonar ranging and detection may be added or substituted for the optical camera photogrammetry described above. Among these means are electromagnetic detection means such as radar, time of flight range measurement using nanosecond (30 cm resolution) and femtosecond (0.3 mm resolution) laser pulses. Use of retroreflectors attached to the above water objects used as fixed points also anticipated. Positioning one or more stationary GPS technology transmitters in a location where the GPS signals are not blocked by interfering objects allows use of the vessel GPS technology to correct the position, yaw and pitch of the vessel.

Obviously, many modifications and variations of the present invention are possible in light of the above teachings. It is therefore to be understood that, within the scope of the appended claims, the invention may be practiced otherwise than as specifically described.

We claim:

1. A method of real time three dimensional (3D) sonar imaging, comprising:
    insonifying a volume of fluid with a series of sonar pings;
    receiving for each of the series of sonar pings sonar signals reflected from a first set one or more objects in the volume of fluid, wherein the sonar signals are received with a multielement detector array of sonar signal detectors;
    beamforming the detected sonar signals to provide a series of three-dimensional sonar images of the one or more objects in the first set, wherein the positions and the distances of the objects in the first set with respect to the multielement detector array of sonar signal detectors are imaged repeatedly at regular intervals;
    measuring the position of the multielement detector array of sonar signal detectors with respect to a second set of one or more objects outside the fluid, wherein at least one of the objects inside the volume of fluid and at least one of the objects outside the fluid are fixed in relationship to one another, wherein the position of the multielement detector array of sonar signal detectors with respect to one or more objects outside the fluid is measured using electromagnetic radiation means repeatedly at regular intervals; and
    providing a spatially corrected merged view or map representation of the three dimensional sonar images of the one or more objects in the first set using the position and orientation of the multielement detector array with respect to the second set to correct apparent position and/or orientation errors between frames for each ping in the series of sonar pings, and wherein the spatially corrected merged view or map representation is updated at regular intervals.

2. The method of claim 1, wherein the position of the multielement detector array is measured with optical photogrammetry.

3. The method of claim 1, wherein the position of the multielement detector array is measured with Lidar technology.

4. The method of claim 1, wherein the position of the multielement detector array is measured with a time of flight camera.

5. The method of claim 1, wherein the position of the multielement detector array is measured using reflective targets in a known spatial relationship with the second set of objects.

6. The method of claim 1, wherein the position of the multielement detector array is measured with radar reflective technology.

7. The method of claim 1, wherein the position of the multielement detector array is measured with GPS technology and wherein at least one GPS transmitter is located in a known position with respect to the second set of objects.

8. A method of real time three dimensional (3D) sonar imaging, comprising:
    insonifying a volume of fluid with a series of sonar pings;
    receiving for each of the series of sonar pings sonar signals reflected from a first set one or more objects in the volume of fluid, wherein the sonar signals are received with a multielement detector array of sonar signal detectors;

beamforming the detected sonar signals to provide a series of three-dimensional sonar images of the one or more objects in the first set, wherein the positions and the distances of the objects in the first set with respect to the multielement detector array of sonar signal detectors are imaged repeatedly at regular intervals of less than 0.25 seconds;

measuring the position of the multielement detector array of sonar signal detectors with respect to a second set of one or more objects outside the fluid, wherein at least one of the objects inside the volume of fluid and at least one of the objects outside the fluid are fixed in relationship to one another, wherein the position of the multielement detector array of sonar signal detectors with respect to one or more objects outside the fluid is measured using electromagnetic radiation means repeatedly at regular intervals; and providing a spatially corrected merged view or map representation of the three dimensional sonar images of the one or more objects in the first set using the position and orientation of the multielement detector array with respect to the second set to correct apparent position and/or orientation errors between frames for each ping in the series of sonar pings, and wherein the spatially corrected merged view or map representation is updated at regular intervals of less than 0.2 seconds.

9. The method of claim 8, wherein the position of the multielement detector array is measured with optical photogrammetry.

10. The method of claim 8, wherein the position of the multielement detector array is measured with Lidar technology.

11. The method of claim 8, wherein the position of the multielement detector array is measured with a time of flight camera.

12. The method of claim 8, wherein the position of the multielement detector array is measured using reflective targets in a known spatial relationship with the second set of objects.

13. The method of claim 8, wherein the position of the multielement detector array is measured with radar reflective technology.

14. The method of claim 8, wherein the position of the multielement detector array is measured with GPS technology wherein at least one GPS transmitter is located in a known position with respect to the second set of objects.

15. The method of claim 8, wherein the spatially corrected merged view or map representation is updated at regular intervals of less than 0.25 seconds.

16. The method of claim 8, wherein the spatially corrected merged view or map representation is updated at regular intervals of less than 0.15 seconds.

17. The method of claim 8, wherein the spatially corrected merged view or map representation is updated at regular intervals of less than 0.05 seconds.

* * * * *